(12) United States Patent
Kojima (10) Patent No.: US 7,748,052 B2
(45) Date of Patent: Jun. 29, 2010

(54) SCANNING PROBE MICROSCOPE AND METHOD OF OPERATING THE SAME

(75) Inventor: Hideo Kojima, Tokyo (JP)

(73) Assignee: JEOL Ltd., Tokyo (JP)

( * ) Notice: Subject to any disclaimer, the term of this patent is extended or adjusted under 35 U.S.C. 154(b) by 252 days.

(21) Appl. No.: 11/486,399

(22) Filed: Jul. 13, 2006

(65) Prior Publication Data

US 2007/0018097 A1    Jan. 25, 2007

(30) Foreign Application Priority Data

Jul. 13, 2005    (JP) .............................. 2005-204031
May 23, 2006    (JP) .............................. 2006-142187

(51) Int. Cl.
*G01Q 10/00*    (2010.01)
*G01Q 10/06*    (2010.01)

(52) U.S. Cl. ............................................. 850/4; 850/1

(58) Field of Classification Search ................. 250/306, 250/307; 977/851; 850/1, 3, 4
See application file for complete search history.

(56) References Cited

U.S. PATENT DOCUMENTS 4,889,988 A * 12/1989 Elings et al. ................. 250/306
4,954,704 A * 9/1990 Elings et al. .................... 850/4
5,229,606 A * 7/1993 Elings et al. .................... 850/1
5,418,363 A * 5/1995 Elings et al. .................... 850/1

FOREIGN PATENT DOCUMENTS

| JP | 06-265344 | 9/1994 |
| JP | 10-282127 | 10/1998 |
| JP | 2003166927 A * | 6/2003 |

* cited by examiner

*Primary Examiner*—Jack I Berman
*Assistant Examiner*—Brooke Purinton
(74) *Attorney, Agent, or Firm*—The Webb Law Firm (57) ABSTRACT

A scanning probe microscope capable of preventing contact between the probe and a sample and a method of operating this microscope. The scanning probe microscope measures the topography of a surface of the sample by scanning the probe relative to the surface of the sample. A scanning reference position in the heightwise direction is updated in response to a maximum value of the height of the surface of the sample on the scan lines scanned so far. A limit value is set for motion of the probe in the heightwise direction relative to the scanning reference position. After the update, the next scan line is scanned. In this way, scanning is carried out along the successive scan lines.

8 Claims, 6 Drawing Sheets

SCANNING
A1 REFERENCE ———————
POSITION

SCANNING
A1 REFERENCE ———————
POSITION

A2

NEW SCANNING
REFERENCE
POSITION
A3 
OLD SCANNING
REFERENCE
POSITION

SCANNING PROBE MICROSCOPE AND METHOD OF OPERATING THE SAME

BACKGROUND OF THE INVENTION

1. Field of the Invention

The present invention relates to a scanning probe microscope and to a method of operating the microscope.

2. Description of Related Art

Figure 8:
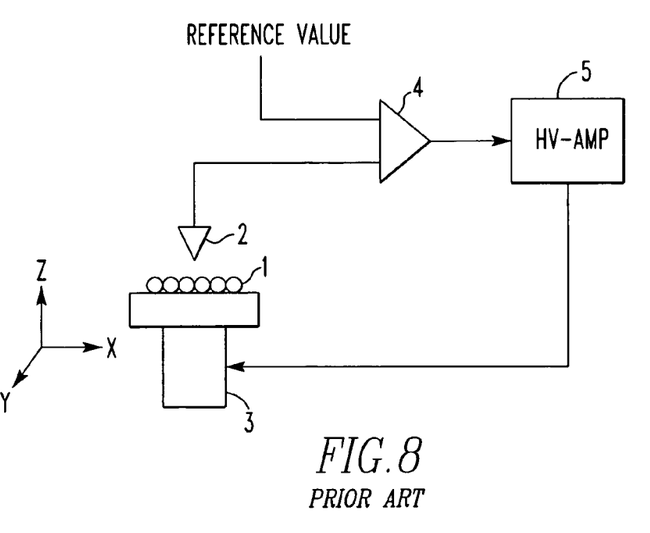
FIG. 8 is a diagram of a feedback circuit incorporated in a prior art scanning probe microscope (SPM).

A scanning probe microscope is an instrument capable of measuring the topography of a sample surface at an atomic resolution by scanning the surface using a tungsten probe or cantilever (hereinafter referred to as a probe). FIG. 8 is a diagram showing a feedback circuit incorporated in a scanning probe microscope (SPM). Shown in this figure are a sample 1, a probe 2, a scanner 3 carrying the sample 1 thereon to move the sample in X-, Y-, and Z-directions, a comparator 4 for comparing the output signal from the probe 2 with a reference value, and a Z-drive power supply 5 receiving the output from the comparator 4 and controllably driving the scanner 3 in the Z-direction. For example, a high-voltage (HV) amplifier is used as the Z-drive power supply.

In the circuit designed in this way, a physical amount (such as tunnel current, interatomic force, magnetic force, or electrostatic force) exerted between the probe 2 and the sample 1 is detected. A voltage for control of motion in the Z-direction (Z-motion) is applied to the scanner 3 such that the detected physical amount is kept constant. Thus, motion of the scanner 3 in the Z-direction is controlled. In this way, the sample 1 is moved in the Z-direction (in the heightwise direction) in response to the voltage. The position taken in the Z-direction is controlled.

The sample 1 is moved along the X-Y plane by operating the scanner 3 in the X- and Y-directions while the feedback circuit is in operation. Consequently, a topographic image of the sample surface can be produced. In particular, the voltage at which the scanner 3 is driven is detected as a topography signal corresponding to the topography of the sample surface. In other cases, an electrical current flowing through the probe 2 is detected as a topography signal corresponding to the topography of the sample surface.

A known instrument of this kind (see, for example, Japanese Patent Laid-Open No. H6-265344) has a wide-range measurement device for creating an image of a sample surface and a measuring device for producing a microscopic image of the sample surface by scanning the probe relative to the surface. This technique is characterized in that collision of the probe with convex portions of the sample surface is avoided and that the probe can be moved quickly. In another known technique (see, for example, Japanese Patent Laid-Open No. H10-282127), the probe is scanned along the sample surface while the probe and sample are brought close to each other to such an extent that they affect each other physically. Information about the surface of the sample is obtained based on information about variations in the position of the probe. This instrument has a height-measuring device for measuring the height of the measured surface of the sample to be observed before the probe is brought close to the sample.

In a scanning probe microscope, the probe scans over the sample surface while the distance between the sample surface and the probe is kept constant. However, when the probe scans over tall convex portions on the surface, dust, scratches, edges, or the like, the Z-motion of the sample caused by the scanner may not follow rapid variations in the height of the sample surface. In such cases, there is the danger that dust adheres to the tip of the probe or the probe itself touches the sample surface. If dust adheres to the tip of the probe, it is impossible to perform precise measurements. If the probe touches the sample surface, the probe is damaged, making it impossible to perform measurements.

SUMMARY OF THE INVENTION

It is an object of the present invention to provide a scanning probe microscope capable of certainly preventing collision between probe and sample. It is another object of the present invention to provide a method of operating this scanning probe microscope.

A first embodiment of the present invention provides a scanning probe microscope for measuring the topography of a surface of a sample by scanning a probe relative to the surface. A scanning reference position in the heightwise direction is updated in a corresponding manner to a maximum value of the height of the sample surface on scan lines scanned so far. A limit value is set for movement of the probe in the heightwise direction relative to the scanning reference position. After the update, the next scan line is scanned. In this way, scanning is performed along successive scan lines.

A scanning probe microscope according to a second embodiment of the present invention is based on the first embodiment and is further characterized in that the scanning reference position in the heightwise direction is updated in a corresponding manner to the maximum value of the height of the sample surface obtained by scanning of the immediately previous scan line.

A scanning probe microscope according to a third embodiment of the present invention is based on the first or second embodiment and is further characterized in that the limit value can be set from the outside.

A scanning probe microscope according to a fourth embodiment of the present invention is based on any one of the first through third embodiments and is further characterized in that the scanning reference position can be set based on information about the height of a point specified within an image of the surface of the sample.

A scanning probe microscope according to a fifth embodiment of the present invention is based on any one of the first through fourth embodiments and is further characterized in that during scanning performed along successive pixel lines after the update, certain ones of the pixel lines constituting an acquired image of the surface of the sample are skipped.

A sixth embodiment of the present invention provides a method of operating a scanning probe microscope by measuring topography of a surface of a sample by scanning a probe relative to the surface of the sample. This method starts with updating a scanning reference position in a heightwise direction in a corresponding manner to a maximum value of the height of the surface of the sample on scan lines scanned so far. A limit value is set for movement of the probe in the heightwise direction relative to the scanning reference position. After the update, the next scan line is scanned. In this way, scanning is performed along successive scan lines.

A seventh embodiment of the present invention is based on the sixth embodiment and is further characterized in that the scanning reference position in the heightwise direction is updated in a corresponding manner to the maximum value of the height of the surface of the sample obtained when the immediately previous scan line was scanned.

An eighth embodiment of the present invention is based on the sixth or seventh embodiment and is further characterized in that during scanning performed along successive pixel lines after the update, certain ones of the pixel lines constituting an acquired image of the surface of the sample are skipped.

According to the first embodiment of the present invention, the scanning reference position in the heightwise direction is updated in a corresponding manner to the maximum value of the height of the sample surface on scan lines scanned so far. A limit value is set for movement of the probe in the heightwise direction relative to the scanning reference position. After the update, the next scan line is scanned. In this way, scanning is performed along successive scan lines. Consequently, contact between the probe and sample can be prevented.

According to the second embodiment, the scanning reference position in the heightwise direction is updated in a corresponding manner to the maximum value of the height of the sample surface obtained when the immediately previous scan line was scanned. Consequently, contact between the probe and sample can be prevented. Under this condition, measurements can be carried out more efficiently.

According to the third embodiment, the operator is permitted to set the limit value preferably, because the limit value can be set from the outside.

According to the fourth embodiment, feedback control can be provided based on the specified point within the image of the surface, because the scanning reference position can be set based on the height of the point specified within the image of the surface of the sample.

According to the fifth embodiment, measurements can be carried out more efficiently, because during scanning performed along successive pixel lines after the update, certain ones of the pixel lines constituting an acquired image of the surface of the sample are skipped.

According to the sixth embodiment, the scanning reference position in the heightwise direction is updated in a corresponding manner to the maximum value of the height of the surface of the sample on the scan lines scanned so far, in the same way as in the first embodiment. A limit value is set for movement of the probe in the heightwise direction relative to the scanning reference position. After the update, the next scan line is scanned. In this way, scanning is performed along successive scan lines. Consequently, it is assured that contact between the probe and sample is prevented.

According to the seventh embodiment, the scanning reference position in the heightwise direction is updated in a corresponding manner to the maximum value of the height of the sample surface obtained by scanning of the immediately previous scan line, in the same way as in the second embodiment. Hence, contact between the probe and sample is prevented. Under this condition, scanning can be carried out more efficiently.

According to the eighth embodiment, after the update, scanning is done along the successive pixel lines while skipping certain ones of the pixel lines constituting an acquired image of the sample surface, in the same way as in the fifth embodiment. Consequently, measurements can be carried out more efficiently.

Other objects and features of the present invention will appear in the course of the description thereof, which follows.

DESCRIPTION OF THE PREFERRED EMBODIMENTS

Modes of practice of the present invention are hereinafter described in detail with reference to the accompanying drawings. The configuration of a scanning probe microscope according to a first embodiment of the present invention is similar to the configuration already described in connection with FIG. 8. The operation of this scanning probe microscope is described below.

Figure 1:
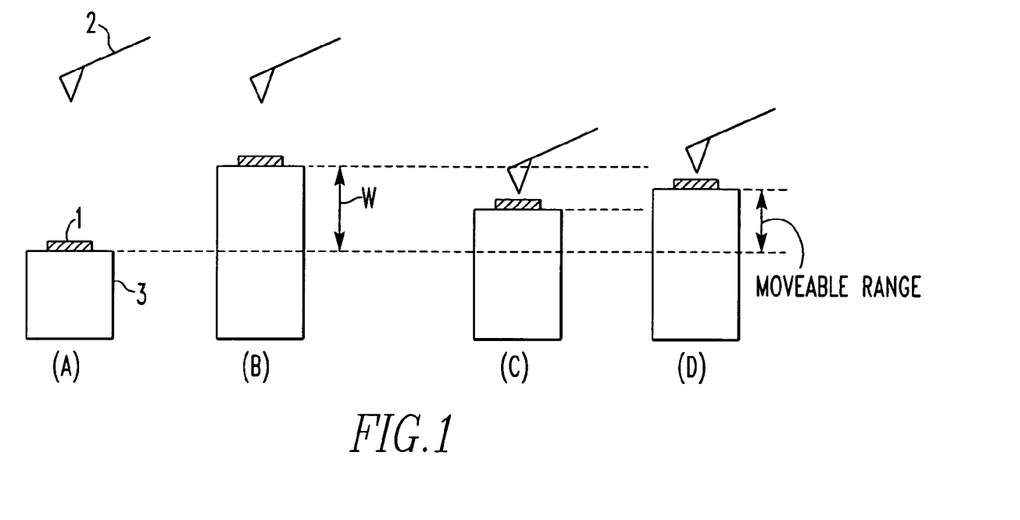
FIG. 1 illustrates the operation of a scanner.

FIG. 1 is a diagram illustrating the operation of the scanner. Like components are indicated by like reference numerals in both FIGS. 1 and 8. Shown in FIG. 1 are a sample 1, a probe 2, and the scanner 3. In FIG. 1, position (a) shows a retracted state, position (b) shows the condition in which the scanner is stretched to its maximum width, position (c) shows the manner in which the probe is approaching the sample, and position (d) shows the manner in which a movable range has been set. In the approaching state shown in position (c), the scanner is set in the position where it can be stretched and contracted. As an example, a piezoelectric device capable of stretching and contracting according to the applied voltage is used as the scanner 3.

The scanner 3 can stretch and contract an amount corresponding to the distance (maximum amplitude W) between the state of position (a) and the state of position (b). Usually, the scanner scans the sample surface at the reference position of position (c). In the present invention, a limit value for the scanner 3 is first set in the direction of stretching (+z-direction) as in position (d). Control is provided to prevent further stretching. The limit value of the scanner 3 can be set in terms of distance. The distance is converted into a voltage from the voltage-amplitude characteristics of the scanner in the Z-direction. The found voltage is applied to the scanner 3.

The feedback already described in connection with FIG. 8 is provided in the movable range of position (d) shown in FIG. 1. The height of the scanner 3 at the location where the scanner is made to approach the sample surface is taken as the initial scanning reference position in the Z-direction. Whenever a scan line is scanned over the sample surface, the scanning reference position is updated.

Figure 2:
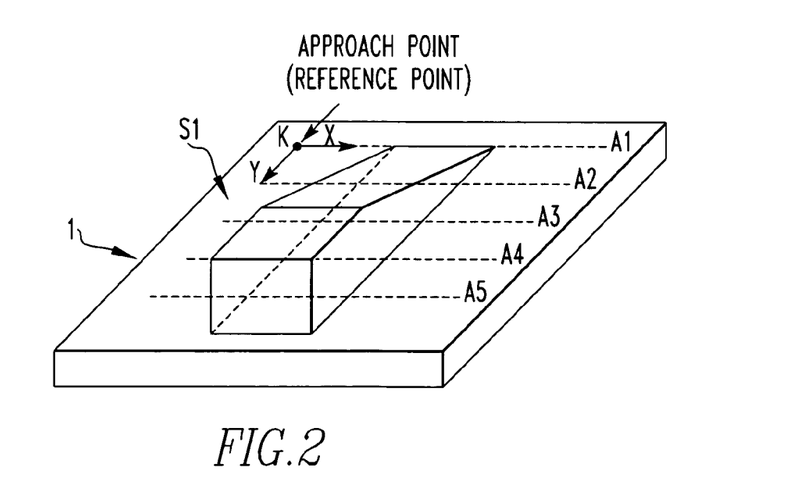
FIG. 2 is a diagram showing an uneven sample surface.

FIG. 2 illustrates an uneven sample surface S1, direction of scanning, and direction of control. The initial scanning reference position is indicated by K and also known as the approach point. This point forms a reference point in the X- and Y-directions.

Figure 3A:
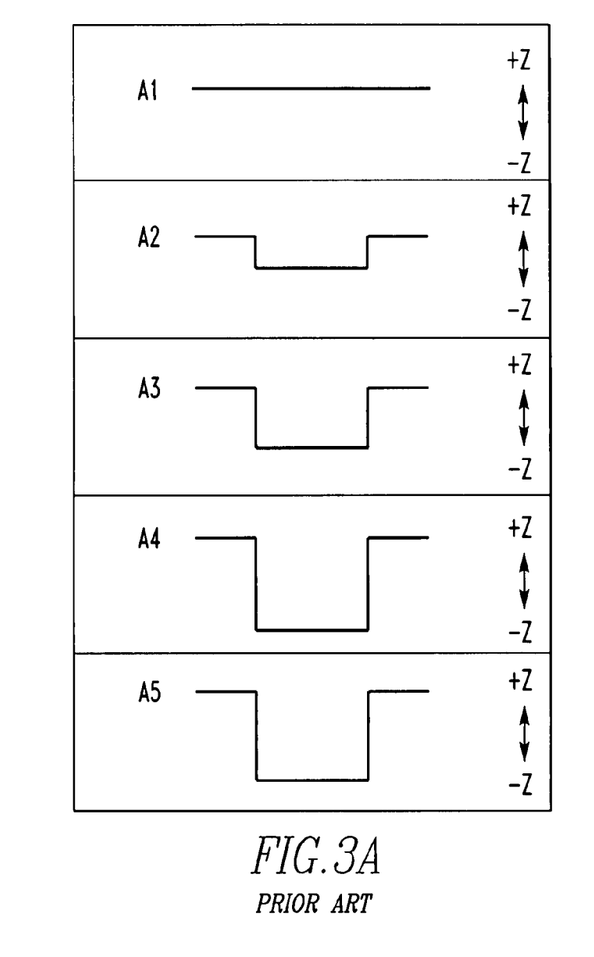
FIGS. 3A and 3B show positional displacement profiles on the top surface of the scanner.

FIG. 3A shows positional displacement profiles of the top surface of the scanner (not shown) on which a sample S is placed when the sample surface S1 of the sample S of FIG. 2 is scanned with a fixed probe (not shown), the profiles being taken in the Z-direction. The scanning is carried out by driving the scanner.

Figure 3B:
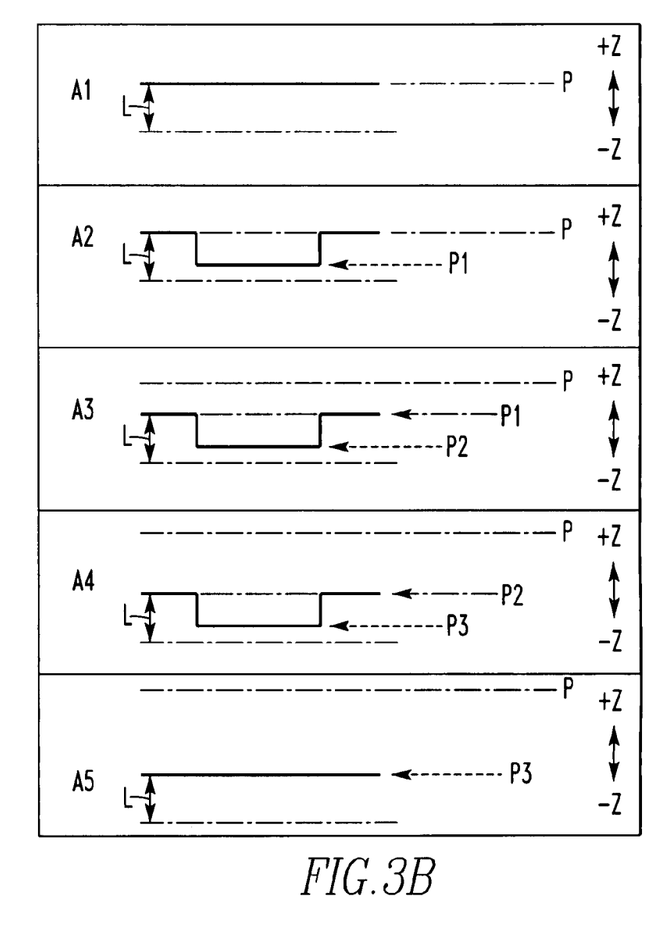

In FIGS. 3A and 3B, solid lines A1 to A5 show positional displacement profiles, respectively, of the scan lines A1 to A5 on the sample surface S1.

In FIG. 3A, the profiles indicate the results of application of the prior-art technique. As scanning goes from scan line A1 to scan line A4 in turn, the height of the convex portion measured along the scan line on the sample surface S1 increases. In response to this, the scanner is driven in the contracting direction (−Z-direction). The position of the top surface of the scanner once descends in response to each detected convex portion. After the end of detection of the convex portion (i.e., after the probe has passed over the convex portion), the scanner is driven in the stretching direction in the +Z-direction. The position of the top surface of the scanner ascends. The height of the convex portion detected over the scan line A5 is equal to the height of the convex portion detected over the scan line A4.

In FIG. 3A, convex portions detected in response to the scan lines A3, A4, and A5, respectively, are higher than the convex portion detected in response to the scan line A2. During scanning of the scan lines A3, A4, and A5, the top surface of the scanner descends to a much lower position than during scanning of the scan line A2 and then ascends.

The speed at which the top surface of the scanner descends in the contracting direction (−Z-direction) has a limit. Therefore, when the top surface of the scanner descends quickly and greatly such as when the scan lines A3, A4, and A5 are scanned, the descending motion of the top surface of the scanner (contracting motion of the scanner) may not catch up with the motion of the top surface of the scanner in the X-direction when the scanner is driven in the X-direction.

In this case, the downward movement of the top surface of the scanner cannot catch up with the motion in the X-direction. There is the danger that the sample placed on the top surface of the scanner touches the probe.

In contrast, the present invention can prevent contact between the probe and sample. The profiles shown FIG. 3B are results of the application of the present invention. In the embodiment shown in FIG. 3B, scanning is performed first along the scan line A1 that is parallel to the X-axis. The height of approach point K (see FIG. 2) on the scan line A1 is taken as the initial scanning reference position P. The position P gives the heightwise position taken in the Z-direction.

When the scan line A1 is scanned, any convex portion to be measured is not detected from the sample surface S1. The resulting profile is almost straight. The results of the scan of the scan line A1 are similar to the results obtained as shown in FIG. 3A.

After the end of the scan of the scan line A1, the next scan line A2 is scanned. At this time, in the present invention, the scanning reference position in the heightwise direction is updated in a corresponding manner to the maximum value of the height of the sample surface on the scan lines scanned so far. After this update, the next scan line is scanned. A lower limit L defining the permissible lowest position of the scanner in the Z-direction is set for each scanning reference position at the beginning of each scan and after each update. The lower limit L corresponds to the limited height of the probe in motion relative to the scanning reference position.

Therefore, when the scan line A2 is being scanned, the scanning reference position in the heightwise direction is updated in a corresponding manner to the maximum value of the height of the sample surface S1 on the scan line A1. The profile line indicating the result of the scanning along the scan line A1 is almost straight as described previously. Therefore, the initial scanning reference position P is taken as the scanning reference position during scanning along the scan line A2. Thus, the scanning reference position is updated. With respect to the Z-direction, scanning is started using the updated scanning reference position.

The result of the scan of the scan line A2 after the update is indicated by the profile A2 in FIG. 3B. In this profile A2, information about the heightwise position P1 is acquired in a corresponding manner to a convex portion detected as an object to be measured. The heightwise position P1 is based on the distance that the top surface of the scanner has descended in response to the detected convex portion.

After the end of the scan line A2, the next scan line A3 is scanned. Also, at this time, the scanning reference position in the heightwise direction is updated in a corresponding manner to the maximum value of the height of the sample surface on the scan lines scanned so far. After the update, scanning of the next scan line is carried out.

When the scan line A3 is scanned, the scanning reference position in the heightwise direction is updated in a corresponding manner to the maximum value of the height of the sample surface S1 on the scan lines A1 and A2. Since the maximum value on the scan lines A1 and A2 gives information about the heightwise position, the scanning reference position used during scanning along the scan line A3 is updated to the heightwise position P1. With respect to the Z-direction, scanning is started using the updated scanning reference position.

The result of the scan of the scan line A3 after the update gives the profile A3 in FIG. 3B. In this profile A3, information about the heightwise position P2 is acquired in a corresponding manner to the convex portion detected as an object to be measured. The heightwise position P2 is based on the distance that the top surface of the scanner has descended in response to the detected convex portion.

After the end of the scanning of the scan line A3, the next scan line A4 is scanned. Also, at this time, the scanning reference position in the heightwise direction is updated in a corresponding manner to the maximum value of the height of the sample surface on the scan line scanned so far. After the end of the update, the next scan line is scanned.

Therefore, during scanning of the scan line A4, the scanning reference position in the heightwise direction is updated in response to the maximum value of the height of the sample surface S1 on the scan lines A1, A2, and A3. Since the maximum value on the scan lines A1, A2, and A3 gives information about the heightwise position P2, the scanning reference position used during scanning of the scan line A4 is updated to P2. With respect to the Z-direction, scanning is started using the updated scanning reference position.

The result of the scan of the scan line A4 after the update gives the profile A4 in FIG. 3B. In this profile A4, information about the heightwise position P3 is acquired in a corresponding manner to the convex portion detected as an object to be measured. The heightwise position P3 is based on the distance that the top surface of the scanner has descended in response to the detected convex portion.

After the end of the scan of the scan line A4, the next scan line A5 is scanned. Also, at this time, the scanning reference position in the heightwise direction is updated in a corresponding manner to the height of the sample surface on the scan lines scanned so far. After the end of the update, the next scan line is scanned.

Therefore, during scan of the scan line A5, the scanning reference position in the heightwise direction is updated in a corresponding manner to the maximum value of the height of the sample surface S1 on the scan lines A1, A2, A3, and A4. Since the maximum value on the scan lines A1-A4 gives information about the heightwise position P3, the scanning reference position used during scanning of the scan line P5 is updated to the heightwise position P3. With respect to the Z-direction, scanning is started using the updated scanning reference position.

The result of the scan of the scan line A5 after the update is the profile A5 in FIG. 3B. In this profile A5, information about the heightwise position P3 is acquired in a corresponding manner to the convex portion detected as an object to be measured. The heightwise position P3 is based on the distance that the top surface of the scanner has descended in response to the detected convex portion.

When scanning is performed along the scan lines A1, A2, A3, A4, and A5, the set limit value L for downward movement of the scanner in the Z-direction from the respective scanning reference positions is used. In the present embodiment, the downward limit value L is set as a given value common to every scanning step. The downward limit value L may be varied among the scan lines.

Figure 4A:
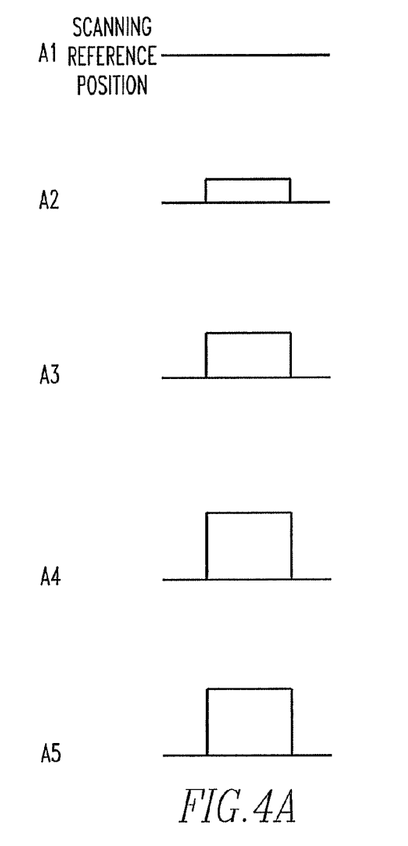
FIGS. 4A and 4B show the topographic profiles of sample surfaces.
Figure 4B:
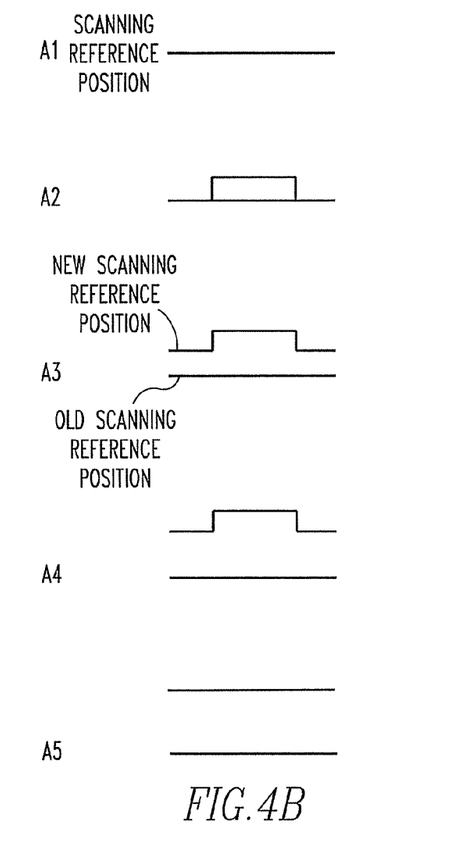

The topographic profile of the sample surface S1 represented as the trajectory of the probe on the sample surface S1 based on the profiles acquired in a corresponding manner to the scan lines A1-A5 is shown in FIGS. 4A and 4B.

FIG. 4A is a topographic profile based on application of the prior-art technique (FIG. 3A), and FIG. 4B is a topographic profile based on application of the present invention (FIG. 3B).

Where a limit value has been set and the scanning reference position is automatically updated as in the present invention, a trajectory (topographic profile) as shown in FIG. 4B is obtained. Because the limit value is set, the range of operation of the scanner is limited in the heightwise direction (+Z-direction).

An old scanning reference position used by the prior-art technique when the scanning reference position is automatically updated is shown in line A3. A novel scanning reference position set by the present invention is also shown in line A3.

When the scanning moves from scan lines A1 to A2, the highest position obtained with line A1 is taken as a new scanning reference position in line A2. When the scanning subsequently moves from line A2 to line A3, the highest heightwise position along line A1 and line A2 on the scanned surface is taken as a new scanning reference position in line A3.

When the scanning moves from scan line A3 to line A4, the highest heightwise position on the sample surface scanned along lines A1, A2, and A3 is taken as the scanning reference position in line A4. Scanning is performed along the successive scan lines by repeating the process steps described so far.

Because of the scanning process described thus far, the reference point is modified in response to every scan line. The range of movement of the scanner in the +Z-direction is limited by the limit value. Therefore, a full image of the sample surface is not formed. However, even if a convex shape is present on the sample surface, contact of the probe is prevented. When a second scanning process is performed, feedback is provided within the set movable range in the Z-direction, using the highest location within the plane as the reference point. Hence, an image is formed.

In this way, according to the present invention, the scanning reference position is shifted in steps such that the scanning reference position taken in the Z-direction varies in steps. Consequently, contact between the probe and sample can be prevented. Furthermore, according to the present invention, the resolution in the Z-direction is lowered. This makes it possible to determine the position in the Z-direction quickly, though roughly. The distance between the probe and sample can be quickly matched.

Another mode of practice of the present invention is next described. In the above-described embodiment, the scanning reference position is automatically updated. The highest position within the sample surface scanned so far is taken as the reference point. According to the contents of measurements, it is better to set the scanning reference position independently. This is enabled by the following method.

Figure 5:
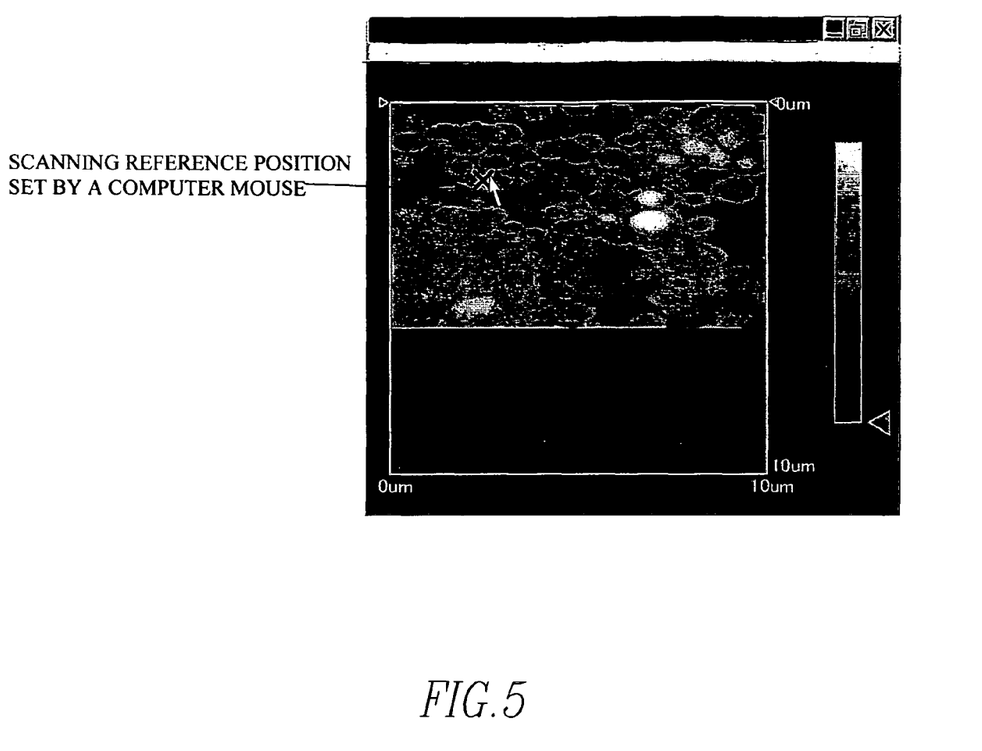
FIG. 5 is a view showing the manner in which a point is specified within an image of a sample surface.

FIG. 5 is a topographical image of a sample surface when a scanning reference position is set using a computer mouse. In the illustrated state, an image of a surface of a sample is shown. The human operator specifies a point in the image of the surface within the currently scanned surface using the mouse. The position indicated by the mouse is denoted by x. The mouse is clicked on this position. The scanning reference position is set based on the information about the height of the specified point. Feedback is provided within the given limit value in the Z-direction, based on the scanning reference position.

In the scanning method illustrated in FIG. 2, in a case where the line A5 is scanned, the highest point within lines A1-A5 is taken as the scanning reference position. Alternatively, the highest point on line A4 may be taken as the reference point when the line A5 is scanned. That is, when the Anth line is scanned, the (An−1)th highest point is taken as the reference point when the Anth line is scanned. That is, the scanning reference position in the heightwise direction is updated in a corresponding manner to the maximum value of the height of the sample surface acquired in the immediately preceding scanning step. After the update, the next scan line is scanned. In this way, scanning is carried out along successive scan lines. In consequence, the scanning reference position is updated based on the information derived from the immediately preceding scanning step. As a whole, the scanning process can be carried out more efficiently.

Figure 6:
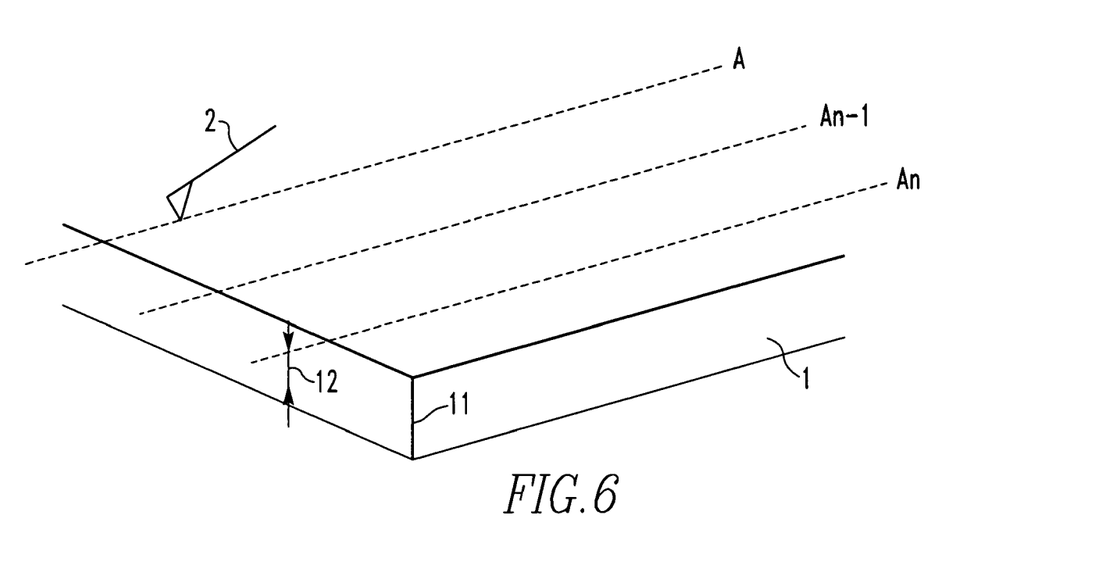
FIG. 6 illustrates an edge portion of a sample.

FIG. 6 illustrates the operation of this mode of practice of the present invention. In FIG. 6, a sample 1 has an edge 11. A limit value in the Z-direction is indicated by numeral 12. Also shown is a probe (or cantilever) 2. For example, when a cross section of a thin sample is observed, the probe falls at the edge and so damage to the probe has presented a problem. In the example shown in FIG. 6, the probe moves relative to the sample surface within a restricted range in the Z-direction. Consequently, scanning is carried out safely.

Furthermore, according to the present invention, the scanning reference position and limit value can be set at will from the outside. As a result, a preferable positional relationship between the probe and sample can be determined.

Figure 7A:
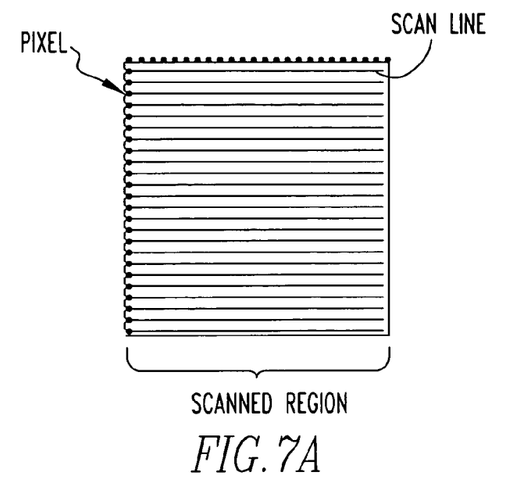
FIGS. 7A and 7B illustrate relations between each scanned region of a sample surface and the number of pixels.
Figure 7B:
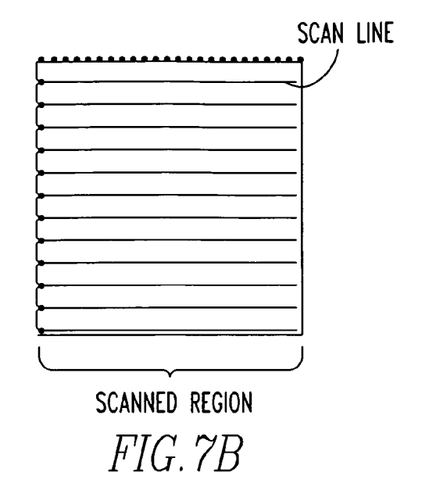

A second embodiment of the present invention is next described by referring to FIGS. 7A and 7B, which illustrate the relationship between a scanned region of a sample surface and the number of pixels. The above-described scanning probe microscope performs a measurement in a corresponding manner to the number of pixels selected from an area that is specified as a specified scanned region. During this measurement, feedback is provided as described previously.

A measurement time necessary to obtain an image of the specified region depends much on the number of pixels within the region. For example, it is assumed that the specified scanned region is 10 µm×10 µm, the number of pixels within the region is 512×512 pixels, and the scan speed is 30 µm/sec. In this case, a measurement time of about 6 minutes is necessary as a whole. The scanned region is modeled as shown in FIG. 7A.

In the second embodiment of the present invention, the scanning reference position is updated with each scan line as described previously. When scanning is performed using a set limit value in the heightwise direction for each scanning reference position, pixels contributing to the measurement are thinned out. FIG. 7B shows an example in which pixels thinned out are used by setting every one horizontal scan line extending in the X-direction (horizontal direction). The horizontal scan lines are arrayed in the Y-direction (vertical direction).

The measurement time necessary for the whole measurement can be reduced by thinning out the pixels in this way. For example, in a case where the specified scanned region is 10 µm×10 µm, the number of pixels within the region is 512×256 pixels, and the scan speed is 30 μm/sec, the whole measurement time is about 3 minutes. The measurement time can be reduced greatly. In consequence, measurements can be carried out efficiently while preventing contact of the probe with the sample surface with certainty.

Data about the pixels corresponding to the scan lines thinned out is complemented based on the pixel data about each previous scan line. Thus, a full image is created.

In the example of FIG. 7B, the horizontal scan lines arrayed in the vertical direction are thinned out. Alternatively, vertical pixel lines arrayed in the horizontal direction (the X-direction) may be thinned out. Furthermore, the number of lines thinned out may be set at will.

In addition, data can be complemented based on image data about lines interposed between lines thinned out. Further, the complemented data can be weighted.

In this way, according to the present invention, the scanning reference position in the heightwise direction is updated in a corresponding manner to the maximum value of the height of the sample surface on the scan lines scanned so far. A limit value is set for movement of the probe relative to the scanning reference position in the heightwise direction. After the update, scanning is performed along the next scan line. In this way, scanning is done along successive scan lines. Hence, contact between the probe and sample can be prevented with certainty.

Where the scanning reference position in the heightwise direction is updated in a corresponding manner to the maximum value of the height of the sample surface on the scan line scanned immediately previously, contact between the probe and sample is prevented with certainty. Under this condition, measurements can be performed more efficiently.

Additionally, the limit value can be set from the outside. Therefore, the operator can preferably set the limit value.

The scanning reference position can be set based on the information about the height of a point specified within the image of the sample surface. Consequently, feedback control can be provided based on the specified point within the surface image.

Where scanning is performed along the successive pixel lines forming an acquired image of the surface of the sample after the update as described above such that certain ones of the pixel lines are skipped, measurements can be carried out more efficiently.

It is to be understood that the present invention can be applied to ultrahigh vacuum scanning probe microscope, ultrahigh vacuum cryogenic scanning probe microscope, and scanning atomic force microscope, as well as to the above-described scanning probe microscope.

In the above-described embodiments, the probe is fixed and the sample is moved in three dimensions by the scanner. The present invention is not limited to this structure. The present invention can be similarly applied to the case where the probe or cantilever is moved in three dimensions.

As described so far, according to the present invention, a limit value for the Z-direction is set. The scanning reference position is automatically updated. Therefore, if the sample surface has rough unevenness, the danger that the probe touches the sample surface can be prevented with certainty. Furthermore, measurements can be carried out on the sample surface under conditions required by the user by setting the scanning reference position at will.

Having thus described my invention with the detail and particularity required by the Patent Laws, what is desired protected by Letters Patent is set forth in the following claims.

The invention claimed is:

1. A scanning probe microscope for scanning a probe relative to a surface of a sample to thereby measure the topography of the surface of the sample, the probe having a function for scanning the sample of the surface while a distance between the surface of the sample and the probe is normally kept constant, further comprising:
   means for repeatedly updating a scanning reference position in a heightwise direction at which scanning is started to a maximum value of height of the surface of the sample on scan lines scanned so far during the measurement of the topography of the sample surface; and
   means for setting a limit value corresponding to a limited relative displacement of the probe moving toward the surface of the sample relative to the updated scanning reference position whereby when the limit value is encountered, scanning at said constant distance is interrupted during the measurement of the topography of the sample surface.

2. A scanning probe microscope as set forth in claim 1, wherein the means for updating the scanning reference position in the heightwise direction updates the reference position in a corresponding manner to the maximum value of the height of the surface of the sample obtained by scanning of an immediately previous scan line.

3. A scanning probe microscope as set forth in claim 1 or 2, wherein said limit value can be set from the outside.

4. A scanning probe microscope as set forth in claim 1 or 2, wherein said scanning reference position can be set based on information about the height of a point specified within an image of the surface of the sample.

5. A scanning probe microscope as set forth in claim 1 or 2, wherein after said update, scanning is carried out along successive pixel lines forming an acquired image of the surface of the sample while skipping certain ones of the pixel lines.

6. A method of operating a scanning probe microscope for measuring topography of a surface of a sample by scanning a probe relative to the surface of the sample while a distance between the surface of the sample and probe is normally kept constant, said method comprising the steps of:
   obtaining a maximum value of height of the surface of the sample on scanning lines scanned so far;
   repeatedly updating a scanning reference position at which scanning is started in a heightwise direction to said maximum value of the height;
   setting a limit value corresponding to a limited relative displacement of the probe moving toward the surface of the sample relative to the updated scanning reference position during the measurement of the topography of the sample surface;
   scanning a next scan line after the update; and
   repeating these steps such that scanning is performed along successive scan lines until the limit value is encountered interrupting scanning at said constant distance during the measurement of the topography of the sample surface.

7. A method of operating a scanning probe microscope as set forth in claim 6, wherein the scanning reference position in the heightwise direction is updated in response to the maximum value of the height of the surface of the sample obtained when an immediately previous scan line was scanned.

8. A method of operating a scanning probe microscope as set forth in claim 6 or 7, wherein after said update, scanning is performed along successive pixel lines forming an acquired image of the surface of the sample while skipping certain ones of the pixel lines.

* * * * *